Nov. 3, 1970  A. L. ASHLOCK  3,537,830
APPARATUS FOR GRINDING
Filed Sept. 10, 1968

INVENTOR.
ALBERT L. ASHLOCK
By
Attorney

United States Patent Office 3,537,830
Patented Nov. 3, 1970

3,537,830
APPARATUS FOR GRINDING
Albert Lee Ashlock, Eastview, Ky., assignor to Crucible Inc., Pittsburgh, Pa., a corporation of Delaware
Filed Sept. 10, 1968, Ser. No. 758,869
Int. Cl. B24b 5/02
U.S. Cl. 51—96                              2 Claims

ABSTRACT OF THE DISCLOSURE

This disclosure relates to a method and apparatus for surface grinding permanent magnet segments of arcuate configuration. The invention embodies a vacuum chuck adapted to receive and hold said segment in position for grinding. The chuck is adapted for selective positioning a distance from the flat grinding surface of a grinding wheel, and is further adapted to pivot about an axis parallel to the grinding wheel, whereby an exposed surface of the magnet segment is ground to the desired tolerance. The degree of surface removal effected during grinding is governed by the distance between the chuck axis and the grinding surface of the wheel.

---

Figure 2:
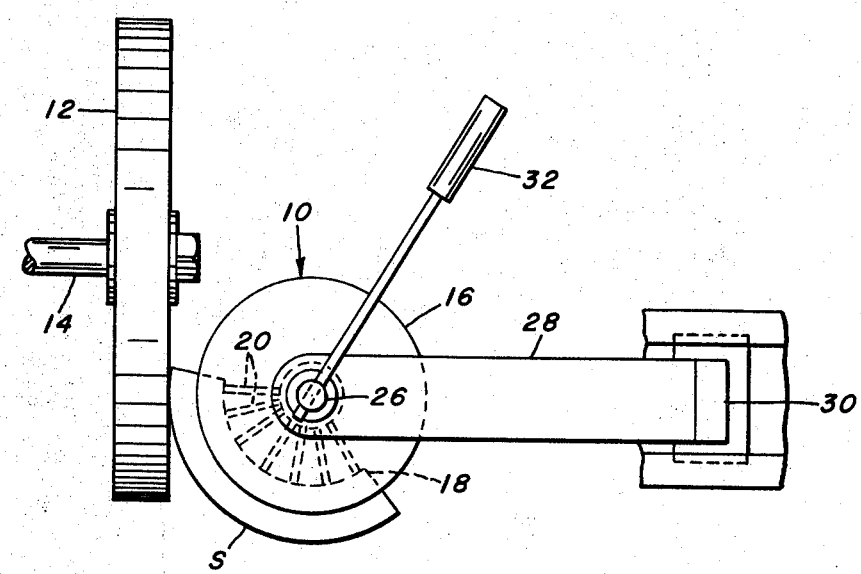

In the manufacture of ceramic, arc-shaped permanent magnet segments, typically a blend of barium carbonate and ferric oxide powders is made and heated to a high temperature at which the blend is sintered to form an agglomerate. The resulting agglomerate is crushed and thereafter milled to form a very fine powder. This powder is used to fill a die, which is put under sufficient pressure to compact the powder. The compact, upon removal from the die, is placed in a furnace for sintering. After sintering, the compact is permitted to cool slowly to room temperature. In some instances, the material may be again reduced to a powder and again placed in a die for pressing in the presence of a strong magnetic field. The use of this magnetic field serves to align each individual powder particle so that its direction of easy magnetization coincides with that of the field, and that in which the finished magnet is to be eventually magnetized. After pressing, the compact is sintered.

Although the dies used in this operation may be produced to very close dimensional tolerances, such tolerances cannot be maintained in the product or compact produced in the die. During the sintering operation, extensive shrinkage and thus size variation characterizes the compact. Consequently, the arc-shaped compacts must be subjected to a final machining operation. The machining operation must be such as to insure tolerances on the order of ±.020 inch for dimensions of less than one inch and of ±.031 inch for dimensions from one to three inches. In many cases much closer tolerances are required.

With arc-shaped ferrite magnet segments, the required final grinding operation to achieve the desired tolerances typically embodies a contoured grinding wheel. In this operation, a diamond tool is used to shape the peripheral grinding surface of a grinding-wheel blank so that it conforms to the desired shape of the final magnet segment. The magnet segments to be ground are then passed into grinding contact with the contoured grinding surface of the grinding wheel to achieve the required final tolerances. In view of the strict tolerance requirements for magnet segments, the grinding surface of the wheels must be frequently redressed because of the wearing away of the grinding surface. The frequency of the required redressing of the grinding surface depends upon the tolerances required. It may be seen that because of the frequent redressing of the grinding surface, the use of contoured grinding wheels in the grinding of magnet segments renders this aspect of magnet production extremely expensive. In addition, specific grinding wheels must be employed for specific size segments, which further adds to the overall expense of the operation.

It is accordingly a primary object of this invention to provide for the grinding of ferrite arc-shaped magnet segments without requiring the use of contoured grinding wheels.

Another related object of the invention is to provide for the grinding of ferrite, arc-shaped magnet segments wherein a standard grinding wheel may be used to grind segments of various sizes.

Figure 1:
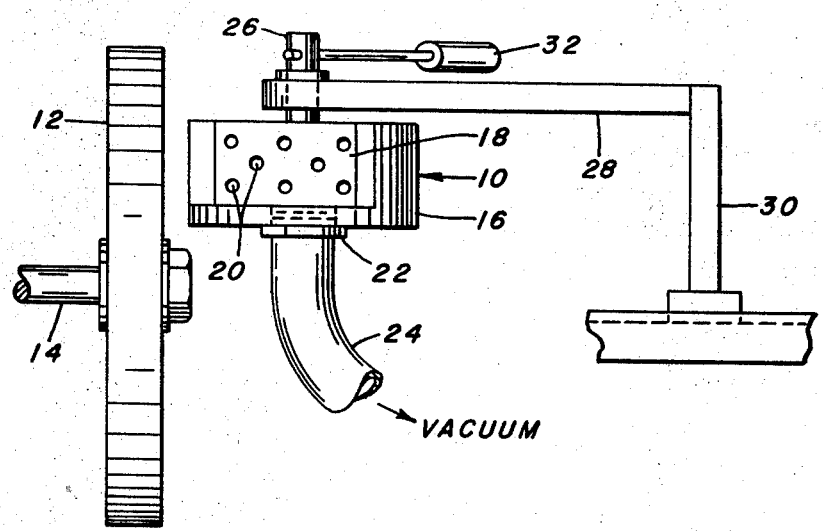

These and other objects of the invention, as well as a complete understanding thereof, may be obtained from the following description and drawings, in which:

FIG. 1 is a view in elevation of one embodiment of apparatus in accordance with the invention; and FIG. 2 is a plan view of the apparatus of FIG. 1 showing a magnet segment in position for grinding.

Broadly, in the practice of the invention an arc-shaped magnet segment is held in a vacuum chuck with the segment surface to be ground exposed. The chuck is pivotally mounted a selected distance from the flat grinding surface of a grinding wheel and is pivoted in relation to said grinding wheel about an axis substantially parallel to the grinding surface. The distance between the chuck axis and the grinding surface is selected in accordance with the amount of surface material to be removed from the magnet segment during grinding. With the magnet segment positioned in the chuck, grinding is achieved by pivoting the chuck to bring the magnet surface to be ground into progressive end-to-end contact with the grinding surface. The vacuum chuck used in the practice of the invention is preferably of generally cylindrical configuration. The chuck has a hollow body and an exterior relieved portion adapted to receive a magnet segment and expose the surface thereof for grinding. The relieved portion of the chuck has a plurality of perforation that open into the hollow body of the chuck. Means are provided for evacuating the hollow body so that a magnet segment may be secured in the relieved portion by suction. Means, such as a hand-operated lever arm, are provided for rotating the chuck about a pivotal axis, which is substantially parallel to the grinding surface of a grinding wheel.

In FIGS. 1 and 2 of the drawings, there is shown a rotatable vacuum chuck, designated generally as 10, and a disc-shaped grinding wheel, designated as 12. Driving means not shown, are connected to shaft 14 of the grinding wheel to rotate the same in the well-known manner during grinding.

The rotatable vacuum chuck assembly 10 consists of a hollow cylindrical chuck 16 having a hollow body and an exterior relieved portion 18. The relieved portion 18 of the chuck has a plurality of perforations 20 that open into the hollow body of the chuck. A coupling 22 positioned on the bottom of the chuck connects the hollow interior thereof to a vacuum line 24, which is connected to means for evacuating the hollow chuck body, such as a conventional vacuum pump (not shown). An axial shaft 26 extends upwardly from the top surface of the chuck. The shaft 26 is journaled for rotation in a horizontal leg 28 of an angle iron 30, which mounts and pivotally supports the chuck assembly in relation to the grinding wheel. The position of the chuck relative to the grinding wheel 12 may be adjusted by movement of the grinding wheel either toward or away from the chuck. Alternately, the chuck could also be moved away from the grinding wheel, such as by providing for the selective mounting of the shaft 26 at various positions along the leg 28. A hand-operated lever arm 32 is attached near the top of shaft 26. The chuck is rotated by movement of the lever arm 32 along a horizontal plane. With the magnet segment, indicated as S in FIG. 2, positioned within the relieved portion of the chuck 18, the exposed surface of the segment may be brought into grinding contact with the grinding wheel by operation of the lever arm to rotate the chuck. By this operation, the exposed surface of the segment is brought progressively into end-to-end grinding contact with the flat surface of the grinding wheel.

The magnet segment is secured for grinding by positioning the same within the relieved portion 18 of the chuck, and then evacuating the hollow chuck body. Because of the perforations 20 opening into the hollow chuck body from the relieved portion, the segment is held in place by suction during evacuation of the chuck body. By the proper positioning of the chuck with respect to the flat grinding surface of the grinding wheel, removal of surface material from the magnet segment during this operation may be such as to achieve the required final tolerances. It may be readily appreciated that by the use of the invention this result is achieved without the use of specially prepared grinding wheels.

Although the invention has been shown and described in relation to a hand-loaded and hand-operated apparatus, it is understood that automatic loading and operation could be achieved without departing from the scope and spirit of the invention as defined in the appended claims.

I claim:

1. An apparatus for surface grinding a magnet segment of arcuate configuration comprising, a grinding wheel, a chuck having a hollow body and an exterior relieved portion adapted to receive said segment and having at least one opening into said hollow body, means for evacuating said hollow body, whereby a segment positioned within said relieved portion is secured therein by suction, means pivotally mounting said chuck on an axis substantially parallel with a flat grinding surface of said grinding wheel, means for varying the distance between said axis and said grinding surface, and means for pivoting said chuck about said axis, whereby the surface of a magnet segment secured to said chuck is brought into grinding contact with the flat grinding surface of said grinding wheel.

2. The apparatus of claim 1 wherein said chuck is of generally cylindrical configuration.

References Cited

UNITED STATES PATENTS

| | | |
|---|---|---|
| 673,093 | 4/1901 | Stevens et al. |
| 1,625,049 | 4/1927 | Oliver _____ 51—96 X |

FOREIGN PATENTS

| | | |
|---|---|---|
| 569,505 | 5/1945 | Great Britain. |

OTHELL M. SIMPSON, Primary Examiner

U.S. Cl. X.R.

51—235; 279—3; 269—21